United States Patent [19]

Wanner et al.

[11] Patent Number: 5,778,199
[45] Date of Patent: Jul. 7, 1998

[54] BLOCKING ADDRESS ENABLE SIGNAL FROM A DEVICE ON A BUS

[75] Inventors: Christopher C. Wanner; Robert L. Woods, both of Tomball, Tex.

[73] Assignee: Compaq Computer Corporation, Houston, Tex.

[21] Appl. No.: 638,143

[22] Filed: Apr. 26, 1996

[51] Int. Cl.[6] .................................. G06F 13/00
[52] U.S. Cl. .......................... 395/287; 395/856
[58] Field of Search ..................... 395/287, 856, 395/281, 280, 848; 365/230.03

[56] References Cited

U.S. PATENT DOCUMENTS

| | | | |
|---|---|---|---|
| 4,446,475 | 5/1984 | Gercekci et al. | 257/48 |
| 4,941,089 | 7/1990 | Fischer | 395/200.01 |
| 4,959,860 | 9/1990 | Watters et al. | 380/4 |
| 4,961,172 | 10/1990 | Shubat et al. | 365/230.06 |
| 5,097,445 | 3/1992 | Yamauchi | 365/195 |
| 5,101,492 | 3/1992 | Schultz et al. | 395/182.05 |
| 5,287,519 | 2/1994 | Dayan et al. | 395/188.01 |
| 5,319,767 | 6/1994 | Lau | 395/280 |
| 5,375,243 | 12/1994 | Parzych et al. | 395/188.01 |
| 5,388,156 | 2/1995 | Blackledge, Jr. et al. | 380/4 |
| 5,396,602 | 3/1995 | Amini et al. | 395/293 |
| 5,454,081 | 9/1995 | Thome | 395/281 |
| 5,500,949 | 3/1996 | Saito | 395/427 |
| 5,513,337 | 4/1996 | Gillespie et al. | 395/479 |
| 5,522,086 | 5/1996 | Burton et al. | 395/829 |
| 5,579,490 | 11/1996 | Michino | 395/281 |
| 5,596,727 | 1/1997 | Literati et al. | 395/281 |
| 5,654,650 | 8/1997 | Gissel | 326/38 |

*Primary Examiner*—Gopal C. Ray
*Attorney, Agent, or Firm*—Fish & Richardson PC

[57] ABSTRACT

A method or apparatus of blocking access to a first device via a bus carrying an address enable signal in a computer system. A second device detects appearance of predetermined bus address information, and the address enable signal is blocked from the first device if the predetermined bus address information is present. A third device connected to the bus and the first device both are responsive to the predetermined bus address information, which includes bus addresses having upper bits with a non-zero value.

29 Claims, 6 Drawing Sheets

TABLE 1

| Block Box Slot One | Cycle Type | Address on Bus | Last Data to SIO_PORT | State of SIOAEN During I/O Cycle | Access Allowed to Power-On Password |
|---|---|---|---|---|---|
| Initial State | I/O | Any Address | Don't care | Pass Through | Yes |
| Protect Resources | I/O | 71H | 37H-3FH (inclusive) | High | No |
| Protect Resources | I/O | 71H | not 37H-3FH (inclusive) | Pass Through | Not Addressing Password |
| Protect Resources | I/O | Address not equal 71H | Don't care | Pass Through | Not Addressing Password |
| Permanently Locked | I/O | 71H | 37H-3FH (inclusive) | High | No |
| Permanently Locked | I/O | 71H | not 37H-3FH (inclusive) | Pass Through | Not Addressing Password |
| Permanently Locked | I/O | Address not equal 71H | Don't care | Pass Through | Not Addressing Password |
| Any State | DMA | Any Address | Don't care | Pass Through | Not Addressing Password |
| Any State | Bus Master | Any Address | Don't care | Pass Through | Not Addressing Password |
| Any State | Refresh | Any Address | Don't care | Pass Through | Not Addressing Password |
| Any State | Memory | Any Address | Don't care | Pass Through | Not Addressing Password |

Figure 3

TABLE 2

SUPER I/O SECURITY CONTROL REGISTER

| BIT 7 | LOCK SIO INDEX ADDRESS, DATA ADDRESS, AND WRITE BLOCK REGISTERS |
|---|---|
| | 1=LOCK DO NOT ALLOW FURTHER WRITES TO THE SIO INDEX ADDRESS, DATA ADDRESS, AND WRITE BLOCK REGISTERS |
| | 0=ALLOW WRITES TO THE SIO INDEX ADDRESS, DATA ADDRESS REGISTERS AND WRITE BLOCK REGISTERS |
| BIT 6 | BLOCK WRITES TO SUPER I/O INDEXES |
| | 1=DISABLE THE SIOWC_ SIGNAL WHEN THE DATA IN THE SIO INDEX DATA REGISTER MATCHES THE DATA IN ANY OF THE SIO WRITE BLOCK REGISTERS AND THE ADDRESS ON THE ISA BUS MATCHES THE DATA IN THE SIO DATA ADDRESS REGISTERS |
| | 0=DO NOT BLOCK WRITES TO SUPER I/O INDEXES |
| BIT 5 | BLOCK WRITES TO CMOS |
| | 1=BLOCK THE SIOWC_ SIGNAL DURING ACCESSES TO CMOS INDEX ADDRESS WHEN THE LAST DATA WRITTEN TO THE SIO_PORT REGISTER IS IN THE RANGE SELECTED IN BIT 4 OF THE SIO SECURITY CONTROL REGISTER |
| | 0=DO NOT BLOCK WRITES TO CMOS |
| BIT 4 | BLOCK WRITES TO CMOS RANGE (BLOCK OCCURS WHEN BIT 5 IS SET TO 1) |
| | 1=CMOS WRITES WILL BE BLOCKED FROM 40H - 7FH (128 BYTES IN TWO PAGES) |
| | 0=CMOS WRITES WILL BE BLOCKED FROM THE 60H - 7FH (64 BYTES IN TWO PAGES) * |
| BIT 3 | BLOCK READS / WRITES TO CMOS |
| | 1=BLOCK THE SIOAEN SIGNAL DURING AN ACCESS TO THE CMOS INDEX ADDRESS AND THE LAST DATA WRITTEN TO SIO_PORT REGISTER IS IN THE RANGE SELECTED IN BIT 2 OF THE SIO SECURITY CONTROL REGISTER |
| | 0=DO NOT BLOCK READS / WRITES TO CMOS |

Figure 5A

TABLE 2

SUPER I/O SECURITY CONTROL REGISTER

| BIT 2 | BLOCK READS / WRITES TO CMOS RANGE (BLOCK OCCURS WHEN BIT 3 IS SET TO 1) |
|---|---|
| | 1=CMOS READS / WRITES ARE BLOCKED FROM THE 78H - 7FH (8 BYTES IN TWO PAGES) |
| | 0=CMOS READS / WRITES ARE BLOCKED FROM THE 7CH - 7FH (9 BYTES IN TWO PAGES) * |
| BIT 1 | FLOPPY WRITE PROTECT |
| | 1=ASSERTED SIOFWP_ SIGNAL TO BLOCK FLOPPY WRITES |
| | 0=SIOFWP_ OUTPUT FOLLOWS FLWP_ INPUT * |
| BIT 0 | RESERVED |
| | |
| | |

Figure 5B

BLOCKING ADDRESS ENABLE SIGNAL FROM A DEVICE ON A BUS

BACKGROUND

The invention relates to blocking access to bus devices.

Aliasing occurs when two or more devices connected to a bus respond to the same bus address. This can occur if one or more of the bus devices receive less than all the address bits. In that case, a port in a device which receives less than all the address bits may respond to a bus address that is targeted to a port of another device. If both devices respond simultaneously, then bus contention may occur.

If a computer system manufacturer determines that aliasing may occur in a system, one typical solution is to physically re-wire the address signals to the device which is causing the address aliasing to prevent the device from responding to a particular bus address. The basic input/output system (BIOS) is then programmed to take into account the address signal re-wiring so that the proper address can be presented to access the device.

SUMMARY

In general, in one aspect, the invention features a computer system having a bus carrying an address enable signal, a first device connected to the bus, and a second device detecting appearance of predetermined bus address information. The second device blocks the address enable signal from the first device if the predetermined bus address information is present.

Certain implementations of the invention include one or more of the following features. The second device allows the first bus enable signal to flow through to the first device if the predetermined bus address information is not present. The bus address information includes the bus address carried by the bus. The bus has only one address enable signal. The second address enable signal is asserted when the first bus enable signal is asserted except when the predetermined bus address information is present. The first device controls a serial port, a parallel port or a floppy disk drive, and blocking the address enable signal to the first device disables access to the serial port, parallel port or floppy disk drive from the bus. The bus includes an ISA bus and the first device includes a super I/O chip. At least another device is connected to the bus, and the second device blocks the address enable signal from the other device if second predetermined bus address information is present. A third device is connected to the bus, and the first and third device both respond to the predetermined bus address information. The bus includes a bus address having address bits, and the predetermined bus address information includes bus addresses having upper bits with a non-zero value.

In general, in another aspect, the invention features a method of blocking access to a first device via a bus carrying an address enable signal in a computer system. A second device detects appearance of predetermined bus address information and blocks the address enable signal from the first device if a predetermined bus address information is present.

Certain implementations of the invention include one or more of the following features. The address enable signal is allowed to pass through to the first device if a predetermined bus address information is not present. The bus carries a bus address, and the bus address information includes the bus address. The bus has only one address enable signal. A second address enable signal is generated to the first device, and the second address enable signal is deasserted if the predetermined bus address information is present. The second address enable signal is asserted when the first bus enable signal is asserted except when the predetermined bus address information is present. The first device controls a serial port, a parallel port, or a floppy disk drive, and the address enable signal is blocked to disable access to the serial port, the parallel port, or the floppy disk drive. The bus includes an ISA bus. The first device includes a super I/O chip. At least another device is connected to the bus, and access to the other device is disabled if second predetermined bus address information is present. The computer system includes a third device connected to the bus, and the first and third bus devices both respond to the predetermined bus address information. The bus includes a bus address having address bits, and the predetermined bus address information includes bus addresses having upper bits with a non-zero value.

Certain implementations of the invention may have one or more of the following advantages. By using a separate device to block the address enable signal, access can be denied to another bus device in response to different types of conditions. Aliasing between bus devices can be prevented without the need for physical re-wiring of signals or the intervention of computer system software.

Other advantages and features will become apparent from the following description and from the claims.

DESCRIPTION

FIG. 3 is a table showing the conditions under which a power-on password is blocked.

FIGS. 5A and 5B are a table describing the bits in a security control register in the peripheral control chip.

Figure 1:
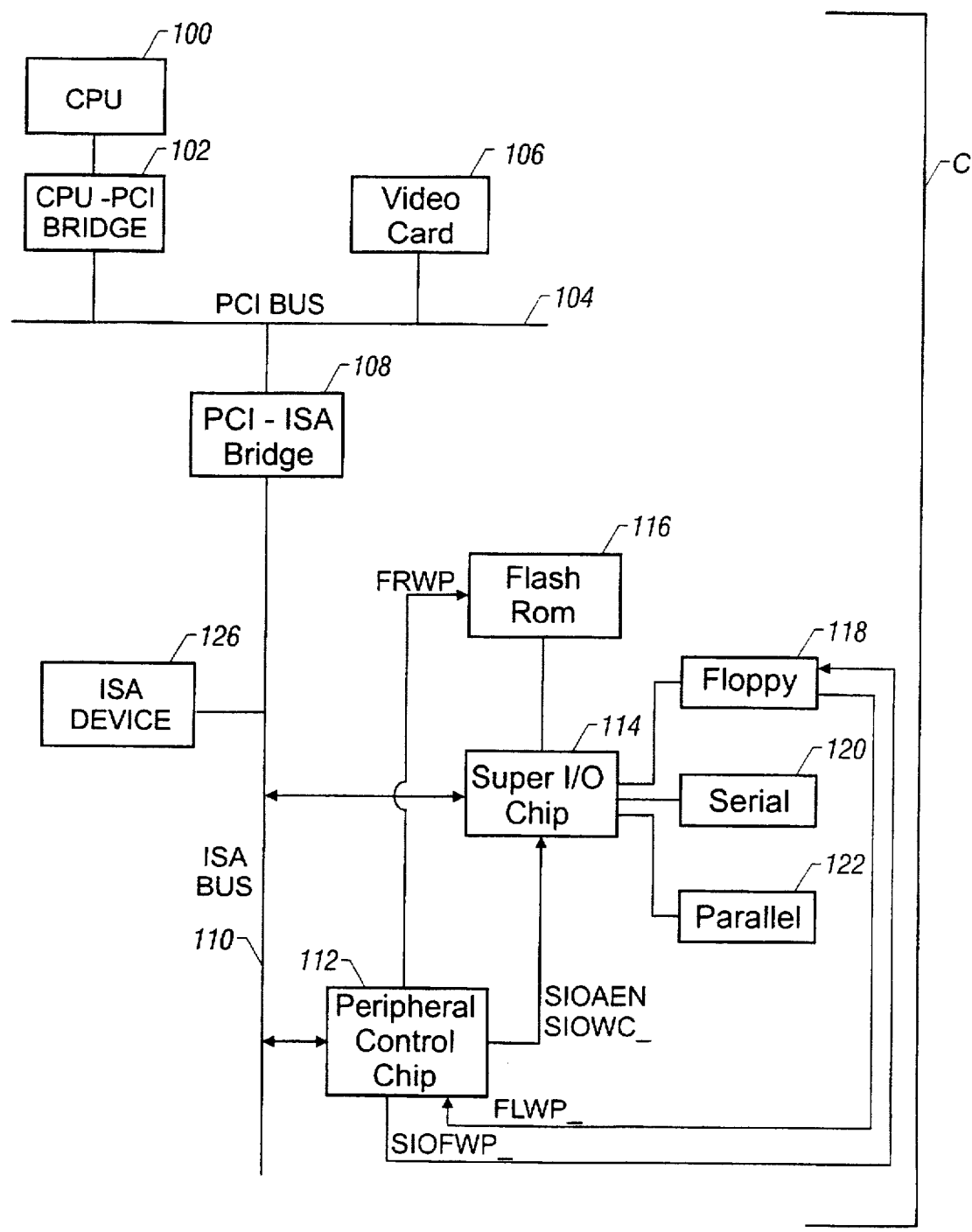
FIG. 1 is a block diagram of a computer system.

Referring to FIG. 1, a computer system C includes a central processing unit (CPU) 100 that communicates with a Peripheral Component Interconnect (PCI) bus 104 through a CPU-PCI bridge 102, which may be implemented with PCMC 82434LX from Intel Corporation or a custom-designed ASIC. The PCI bus 104 may be connected to a video card 106, which controls video signals to a monitor (not shown) such as a CRT monitor. The computer system C also includes an expansion bus 110, such as the Industry Standard Architecture (ISA) bus, which communicates with the PCI bus 104 through a PCI-ISA bridge 108, such as the PIX3 82371SB from Intel Corporation or a customed-designed ASIC. The ISA bus 110 is connected to peripheral devices, such as a super I/O chip 114 (which may be implemented with the PC87306VUL from National or the FDC37C931 from SMC), a peripheral control chip 112, and an ISA device 126. The super I/O chip 114 controls access to the following devices: a flash ROM 116, which stores the BIOS code for controlling power-on functions of the computer system C; a floppy disk drive 118; a serial port 120 for connection to a device such as a mouse; and a parallel port 122 for connection to a device such as a printer. The super I/O chip 114 is connected to the data, address and control portions of the ISA bus 110, but it does not receive the usual ISA address enable signal AEN. All ISA bus cycles directed to the flash ROM 116, floppy disk drive 118, serial port 120 or parallel port 122 are handled by the super I/O chip 114. The super I/O chip 114 also contains CMOS memory for storing CMOS configuration information as well as a power-on password to control user access to the computer system C.

The peripheral control chip 112 is also connected to the data, address and control portions of the ISA bus 110, including the address enable signal AEN. The AEN signal is negated low to enable either the super I/O chip 114 or the peripheral control chip 112 to decode an address on the ISA bus 110. Cycles in which the AEN signal is driven high include a direct memory access (DMA) cycle, an ISA bus master cycle, and a refresh cycle.

The peripheral control chip 112 generates signals SIOAEN and SIOWC_, which are the address enable and write command signals, respectively, to the super I/O chip 114. The peripheral control chip 112 also generates a flash ROM write protect signal FRWP_, which is active low to disable writes to the flash ROM 116. The peripheral control chip 112 receives a floppy write protect signal FLWP_ from the floppy disk drive 118, and it generates a signal SIOFWP_ to the super I/O chip 114 for disabling writes to the floppy disk drive 118.

Figure 2:
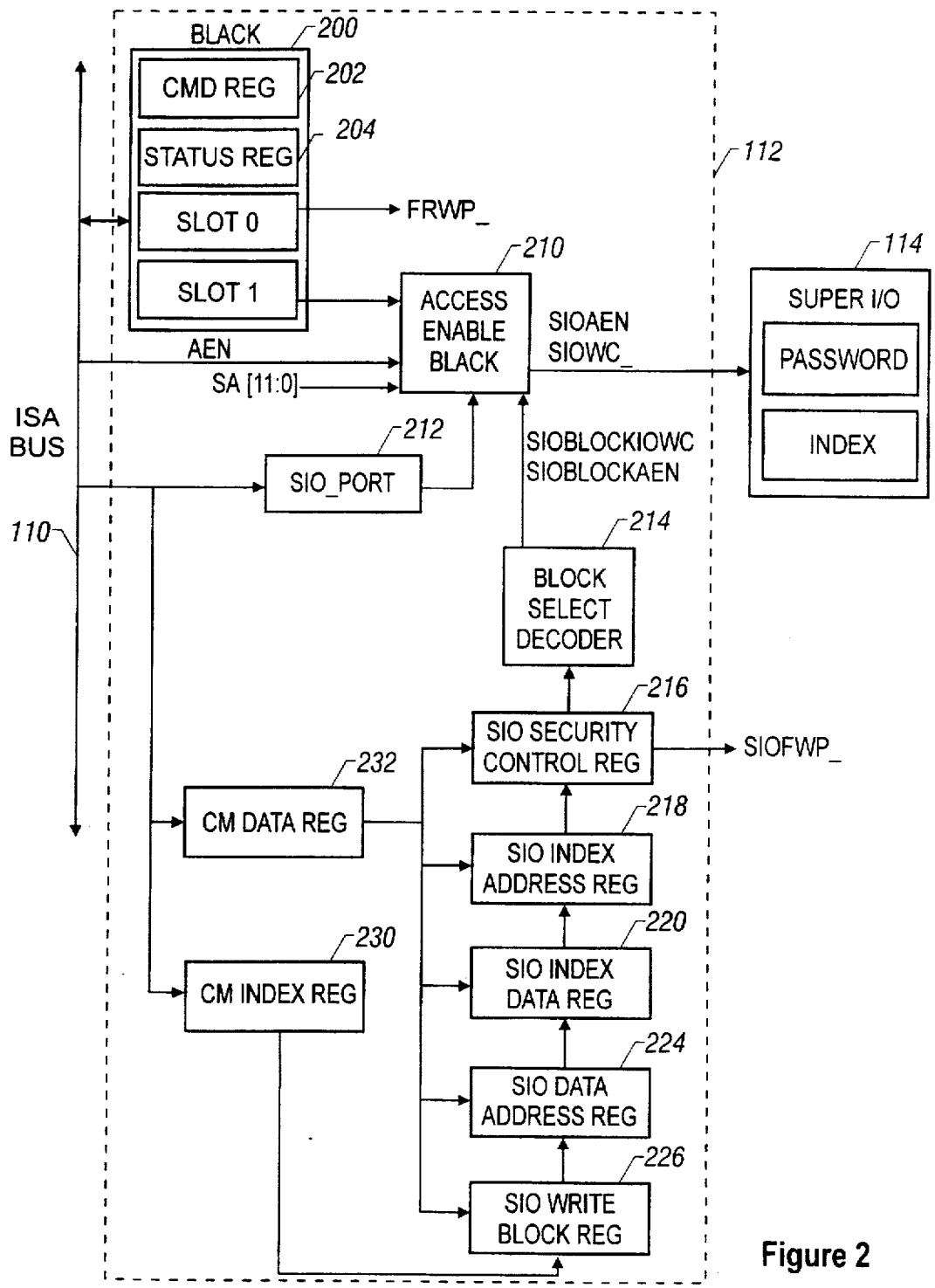
FIG. 2 is a block diagram of a peripheral control chip in the computer system.

Referring to FIG. 2, the peripheral control chip 112 contains a black box 200 having two slots: slot 0 and slot 1. Slot 0 protects the flash ROM 116 from unauthorized writes by controlling the write protect signal FRWP_. Slot 0 unlocks the flash ROM protection mechanism only after a user enters a correct password, which is loaded by the system BIOS into slot 0 during power-up. The signal FRWP_ is deasserted high at reset and is driven active low to protect the flash ROM after a password is written to slot 0 and a protect resources or permanently locked resources command is issued.

Slot 1 is used to prevent access to the power-on password used to control access to the computer system C. Slot 1 also allows the user to change the power-on password during computer run time, so the user does not have to power cycle the computer system C and go into computer setup while booting to change the password. The system BIOS protects the power-on password by storing another password in slot 1 and issuing a protect resources command or a permanently locked resources command. The black box slot 1 and an access enable block 210 control access to the power-on password stored in the super I/O chip 114 by driving the signal SIOAEN high, which prevents the super I/O chip 114 from responding to a bus cycle on the ISA bus 110.

The contents of the black box 200 are accessible through a command register 202 and a data/status register 204. The command register 202 determines if slot 0 or slot 1 is accessed, and it also stores one of the following black box commands: read status, which loads the contents of slot 0 or 1 into the status register 204; store password, which loads the bytes in the data/status register 204 into slot 0 or 1; protect resources, which blocks access to slot 0 or 1 until the proper password is entered or the computer system C is power-cycled; access resources, which causes the bytes in the data/status register 204 to be compared with the stored password in slot 0 or 1 to determine if access should be allowed; and permanently locked resources, which blocks access to slot 0 or 1 until the computer system C is power cycled. To prevent unauthorized over-writing of slot 1, the copy of the password in slot 1 must be first entered before write access is allowed to slot 1.

The data/status register 204 is a read/write register (i.e., it is a data register on writes and a status register on reads). Data register 204 can be written with password bytes, for example, to store a password into slot 0 or slot 1. Status register 204 can be read to determine if slot 0 or 1 is in protect resources mode or permanently locked mode or if a time delay is in progress. A time delay, for example, a one-second delay, can be forced by the black box 200 if a password mismatch occurred.

The peripheral control chip 112 can also block read or write access to the CMOS configuration information stored in the CMOS memory of the super I/O chip 114 by driving the signal SIOAEN high. In addition, the peripheral control chip 112 can block writes to resources controlled by the super I/O chip 114, such as the serial port 120, parallel port 122, floppy disk drive 118, or the CMOS configuration information. To implement the security features, the peripheral control chip 112 includes an SIO_PORT register 212, an SIO security control register 216, an SIO index address register 218, an SIO index data register 220, an SIO data address register 224, and SIO write block registers 226. An index address is written into a client management (CM) index register 230 to select one of the registers 216, 218, 220, 224 and 226, with the contents of the selected register programmed with data written to a CM data register 232.

The SIO security control register 216 can be 8 bits wide and programmed according to Table 2 in FIGS. 5A and 5B. The SIO index address register 218 holds the index address to the super I/O chip 114, which is the address that a configuration register index of the super I/O chip 114 is written to. If an I/O write on the ISA bus 110 contains an address that matches the contents of the index address register 218, the I/O write data, i.e., the current index of the super I/O chip 114, is stored into an SIO index data register 220. The SIO data address register 224 stores the data address of the super I/O chip 114, which is the address that the configuration data of the super I/O chip 114 is written to or read from. Each of the SIO write block registers 226 holds a super I/O configuration index that is blocked to implement such security features as disabling the serial port 120, parallel port 122, and floppy disk drive 118. The index address register 216, index data register 218, data address register 224, and write block register 226 are programmable to different values to protect different index and address ranges.

The contents of registers 216, 224 and 226 are write-protectable by programming the SIO security control register, such as by setting bit 7 high. Thus, once the protected index and address ranges are set, access of the registers 216, 224 and 226 is disabled to prevent software, such as a virus program, from altering the contents of the registers.

Figure 4:
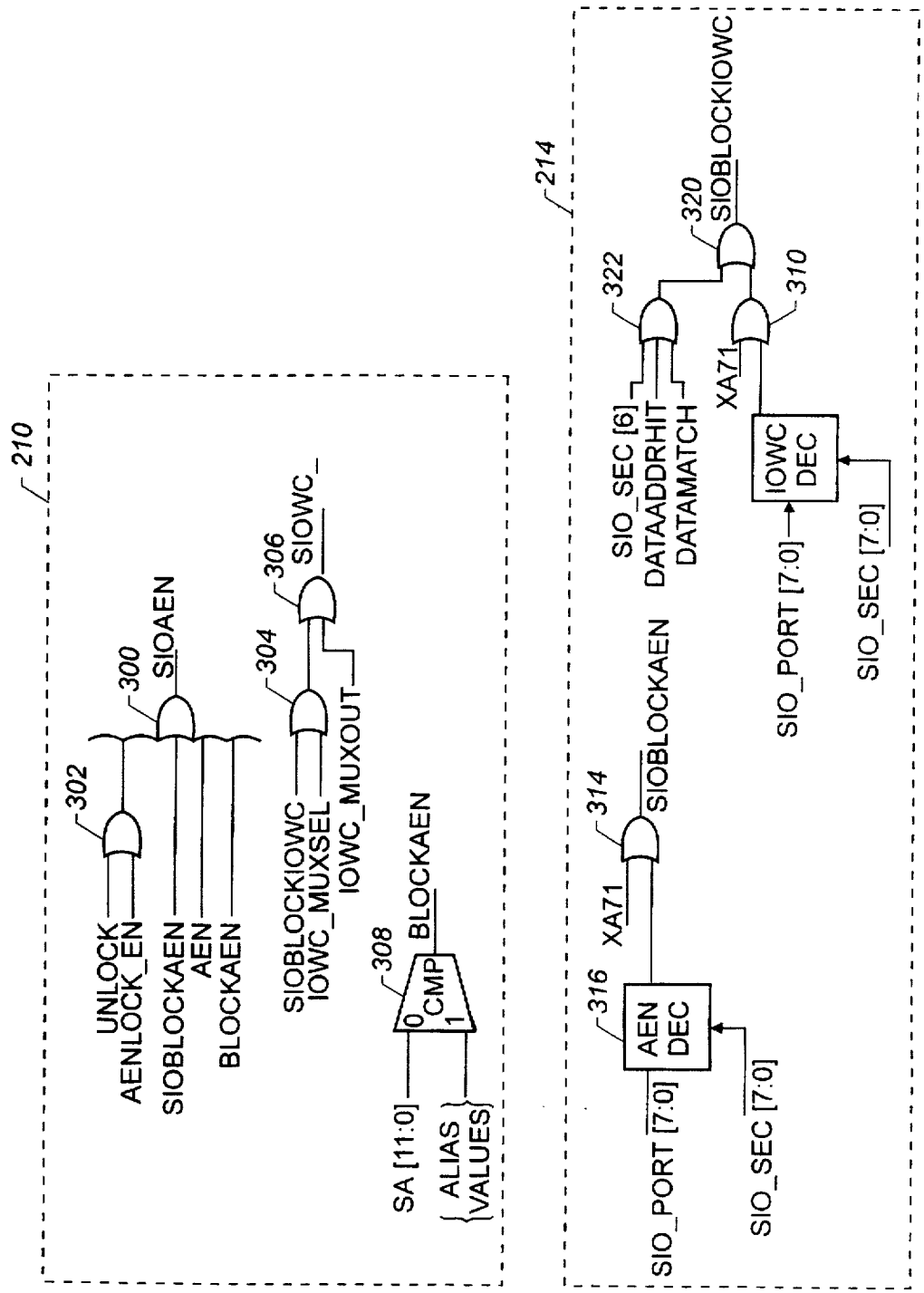
FIG. 4 is a schematic diagram of logic in the peripheral control chip.

Referring to FIG. 3, Table 1 describes how the black box slot 1 controls read or write access to the power-on password stored in the super I/O chip 114. Two conditions cause the access enable block 210 to drive the signal SIOAEN high. The first condition occurs when slot 1 is in protect resources mode, the I/O bus address contains the data address of the super I/O chip 114, and the SIO_PORT register 212 contains the index address of the power-on password. The second condition is the same as the first condition except that slot 1 is in the permanently locked state. In all the other states shown in Table 1, the signal SIOAEN follows the ISA bus address enable signal AEN. The block select decoder 214 (FIG. 2) receives the output bits of the SIO security control register 216 to generate signals SIOBLOCKIOWC and SIOBLOCKAEN to the access enable block 210. Referring to FIG. 4, the access enable block 210 includes a 4-input OR gate 300 for generating the signal SIOAEN. The OR gate 300 receives a signal BLOCKAEN, the ISA address enable signal AEN, a signal SIOBLOCKAEN, and the output of an AND gate 302. The AND gate 302 receives signals UNLOCK_ and AENLOCK_EN.

The signal UNLOCK_ is driven high in response to a protect resources command or a permanently locked resources command to the black box slot 1. The signal AENLOCK_EN is driven high if an I/O cycle contains the data address of the super I/O chip 114 and the SIO_PORT register 212 contains the power-on password data address. Driving both signals UNLOCK_ and AENLOCK_EN high causes the signal SIOAEN to be driven high to prevent access of the power-on password. The signal UNLOCK_ is driven low if an access resources command is issued to the black box slot 1 with the correct password while slot 1 is in the protect resources mode.

The signal SIOBLOCKAEN is driven high by the block select decoder 214 to prevent access to CMOS configuration information stored in the super I/O chip 114. An AND gate 314 for generating the signal SIOBLOCKAEN has one input connected to the signal XA71 (data address of the super I/O chip 114) and the other input connected to the output of an AEN decoder 316. The AEN decoder 316 receives the outputs of the SIO_PORT register 212 and the SIO security control register 216. The signal SIOBLOCKAEN is high if the signal XA71 is asserted, bit 3 of the SIO security register 216 is set high, and the SIO_PORT register 212 contains a value as determined by bit 2 of the SIO security control register 216.

An OR gate 306 generates the signal SIOWC_, which receives a signal IOWC_MUXOUT (the ISA write command signal IOWC_) and the output of an AND gate 304. The AND gate 304 receives a signal SIOBLOCKIOWC and the inverted state of a signal IOWC_MUXSEL, which is used to block the SIOBLOCKIOWC path.

The signal SIOBLOCKIOWC is asserted high by the block select decoder 214 to block writes to the CMOS configuration information in the super I/O chip 114. The block select decoder 214 contains an OR gate 320 for generating the signal SIOBLOCKIOWC. The inputs of the OR gate 320 receive the outputs of AND gates 310 and 322. One input of the AND gate 310 is connected to the output of an IOWC decoder 312, and the other input receives the signal XA71. The IOWC decoder 312 receives the output of the SIO_PORT register 212 and the output of the SIO security control register 216. The signal SIOBLOCKIOWC is high if the signal XA71 is asserted, bit 5 of the SIO security control register 216 is set high, and the SIO_PORT register 212 contains a value determined by the state of bit 4 of the SIO security control register 216.

The AND gate 322 receives bit 6 of the SIO security control register 216 (SIO-SEC[6]), a signal DATAADDRHIT for indicating that the ISA bus address is equal to the address in the SIO data address register 224, and a signal DATAMATCH for indicating that the data in the SIO index data register 220 matches the data in one of the SIO write block registers 226.

To prevent aliasing of addresses between different I/O devices on the ISA bus 110, such as between the super I/O chip 114 and the ISA device 126, a comparator 308 generates the signal BLOCKAEN. For example, an I/O address of 70 h or 71 h is allocated to ports in the super I/O chip 114, which decodes only the 10 least significant address bits. However, the same ports will also respond to address values of 470 h, 471 h, 870 h, 871 h, C70 h or C71 h (i.e. upper two bits contains a non-zero value) presented on the ISA bus 110. Aliasing occurs when more than one bus device responds to a bus address, resulting in bus contention, which may occur if at least one bus device decodes less than the total number of bus address bits. The first input of the comparator 308 receives the ISA bus address signals SA[11:0], and a second input receives the address alias values for comparison to the ISA bus address SA[11:0]. If the comparator 308 determines that an ISA bus address will cause an alias condition, i.e., the upper two ISA address bits SA[11:10] contains a non-zero value, it drives the signal BLOCKAEN high to disable SIOAEN.

The following are some examples of how the security features are implemented. To prevent read or write access to CMOS configuration and information stored in the super I/O chip 114, the index of the SIO security control register 216 is first selected through the CM index register 230, followed by a read of the contents of the SIO security control register 216. The read allows the system software to determine the status of the control register 216. Next, bit 3 of the SIO security control register 216 is set high and bit 2 is set high or low depending on whether 4 or 8 bytes are to be locked. The same procedure is used to prevent write access to the CMOS configuration in the super I/O chip 114, except that bit 5 of the SIO security control register 216 is set high and bit 4 is set high or low depending on whether 192 or 144 bytes are locked. To prevent writes to the floppy disk drive 118, the same procedure is used except that bit 1 of the SIO control register 216 is set high.

To disable the serial port 120, parallel port 122, and the floppy disk drive 118, the following procedure may be used. First, the index address register 218 is selected and written with the index address of the disabled super I/O port. Next, the SIO data address register 224 is selected and written with the data address of the disabled super I/O port. Following that, the indexes of the enable bits in the super I/O chip 114 for the floppy disk drive 118, serial port 120, and parallel port 122 are written into the SIO write block registers 226. This effectively prevents the enable bits from being set in the super I/O chip 114, which disables access to the floppy disk drive 118, the serial port 120, and the parallel port 122. Next, the SIO security control register 216 is selected and the contents of the register read. Next, bits 7 and 6 of the SIO control register 216 are set high. This effectively prevents the contents of the SIO security control register 216, the SIO index address register 218, and the SIO write block register 224 from being changed and disables the signal SIOWC_.

Other embodiments are within the scope of the following claims. For example, the computer system C can be configured without a PCI bus, the ISA bus can be replaced with a different expansion bus, and different types of I/O devices can be connected to the expansion bus.

What is claimed is:

1. A computer system comprising:
    a bus carrying a first address enable signal;
    a first device connected to the bus; and
    a second device detecting appearance of predetermined bus address information and blocking the first address enable signal from the first device if the predetermined bus address information is present,
    the second device allowing the first bus enable signal to flow through to the first device if the predetermined bus address information is not present.

2. The computer system of claim 1, wherein the bus carries a bus address, and wherein the bus address information includes the bus address.

3. The computer system of claim 1, wherein the bus has only one address enable signal.

4. The computer system of claim 1, wherein the bus includes an ISA bus.

5. A computer system comprising:

a bus carrying a first address enable signal, a first device connected to the bus; and a second device detecting appearance of predetermined bus address information and blocking the first address enable signal from the first device if the predetermined bus address information is present, wherein the second device generates a second address enable signal to the first device, the second address enable signal being deasserted if the predetermined bus address information is present.

6. The computer system of claim 5, wherein the second address enable signal is asserted when the first bus enable signal is asserted except when the predetermined bus address information is present.

7. A computer system comprising:

a bus carrying a first address enable signal:

a first device connected to the bus; and a second device detecting appearance of predetermined bus address information and blocking the first address enable signal from the first device if the predetermined bus address information is present, wherein the first device controls a serial port, and wherein blocking the address enable signal to the first device disables access to the serial port from the bus.

8. A computer system comprising:

a bus carrying a first address enable signal;

a first device connected to the bus; and a second device detecting appearance of predetermined bus address information and blocking the first address enable signal from the first device if the predetermined bus address information is present, wherein the first device controls a parallel port, and wherein blocking the address enable signal disables access to the parallel port from the bus.

9. A computer system comprising:

a bus carrying a first address enable signal;

a first device connected to the bus; and a second device detecting appearance of predetermined bus address information and blocking the first address enable signal from the first device if the predetermined bus address information is present, wherein the first device controls a floppy disk drive, and wherein blocking the address enable signal disables access to the floppy disk drive from the bus.

10. A computer system comprising:

a bus carrying a first address enable signal, a first device connected to the bus; and a second device detecting appearance of predetermined bus address information and blocking the first address enable signal from the first device if the predetermined bus address information is present, wherein the first device includes a super I/O chip capable of controlling multiple devices.

11. A computer system comprising:

a bus carrying a first address enable signal;

a first device connected to the bus; and a second device detecting appearance of predetermined bus address information and blocking the first address enable signal from the first device if the predetermined bus address information is present, wherein at least another device is connected to the bus, the second device blocking the address enable signal from the other device if second predetermined bus address information is present.

12. A computer system comprising:

a bus carrying a first address enable signal;

a first device connected to the bus; and a second device detecting appearance of predetermined bus address information and blocking the first address enable signal from the first device if the predetermined bus address information is present, a third device connected to the bus, wherein the first and third devices are both responsive to the predetermined bus address information.

13. The computer system of claim 12, wherein the bus includes a bus address having address bits, and wherein the predetermined bus address information includes bus addresses having upper bits with a non-zero value.

14. A computer system comprising:

a bus carrying a first address enable signal;

a first device connected to the bus; and a second device detecting appearance of predetermined bus address information and blocking the first address enable signal from the first device if the predetermined bus address information is present, wherein the bus includes a bus address having address bits, and wherein the predetermined bus address information includes bus addresses having upper bits with a non-zero value.

15. A method of blocking access to a first device via a bus carrying an address enable signal in a computer system, comprising:

a second device detecting appearance of predetermined bus address information;

blocking the address enable signal from the first device if the predetermined bus address information is present; and allowing the address enable signal to pass through to the first device if the predetermined bus address information is not present.

16. The method of claim 15, wherein the bus carries a bus address, and wherein the bus address information includes the bus address.

17. The method of claim 15, wherein the bus has only one address enable signal.

18. The method of claim 15, wherein the bus includes an ISA bus.

19. The method of claim 15, wherein the first device includes a super I/O chip.

20. A method of blocking access to a first device via a bus carrying an address enable signal in a computer system, comprising:

a second device detecting appearance of predetermined bus address information;

blocking the address enable signal from the first device if the predetermined bus address information is present, and generating a second address enable signal to the first device, the second address enable signal being deasserted if the predetermined bus address information is present.

21. The method of claim 20, wherein the second address enable signal is asserted when the first bus enable signal is asserted except when the predetermined bus address information is present.

22. A method of blocking access to a first device via a bus carrying an address enable signal in a computer system, comprising:

a second device detecting appearance of predetermined bus address information; and blocking the address enable signal from the first device if the predetermined bus address information is present, wherein the first device controls a serial port, the method further comprising:

blocking the address enable signal to disable access to the serial port from the bus.

23. A method of blocking access to a first device via a bus carrying an address enable signal in a computer system, comprising:

a second device detecting appearance of predetermined bus address information; and blocking the address enable signal from the first device if the predetermined bus address information is present, wherein the first device controls a parallel port, the method further comprising:

blocking the address enable signal to disable access to the parallel port from the bus.

24. A method of blocking access to a first device via a bus carrying an address enable signal in a computer system, comprising:

a second device detecting appearance of predetermined bus address information; and blocking the address enable signal from the first device if the predetermined bus address information is present, wherein the first device controls a floppy disk drive, the method further comprising:

blocking the address enable signal to disable access to the floppy disk drive from the bus.

25. A method of blocking access to a first device via a bus carrying an address enable signal in a computer system, comprising:

a second device detecting appearance of predetermined bus address information; and blocking the address enable signal from the first device if the predetermined bus address information is present, wherein at least another device is connected to the bus, the method further comprising:

disabling access to the other device if second predetermined bus address information is present.

26. A method of blocking access to a first device via a bus carrying an address enable signal in a computer system, comprising:

a second device detecting appearance of predetermined bus address information; and blocking the address enable signal from the first device if the predetermined bus address information is present, wherein the computer system further includes a third device connected to the bus, and wherein the first and third devices are both responsive to the predetermined bus address information.

27. The method of claim 26, wherein the bus includes a bus address having address bits, and wherein the predetermined bus address information includes bus addresses having upper bits with a non-zero value.

28. A method of blocking access to a first device via a bus carrying an address enable signal in a computer system, comprising:

a second device detecting appearance of predetermined bus address information; and blocking the address enable signal from the first device if the predetermined bus address information is present, wherein the bus includes a bus address having address bits, and wherein the predetermined bus address information includes bus addresses having upper bits with a non-zero value.

29. A computer system comprising:

an ISA bus carrying an AEN signal and address bits;

a super I/O chip connected to the bus;

an ISA device connected to the bus; and a peripheral control chip detecting appearance of a bus address having upper bits with a non-zero value, wherein both the super I/O chip and the ISA device can respond to the bus address having upper bits with the non-zero value, wherein the peripheral control chip further generates a super I/O address enable signal to the super I/O chip, and wherein the super I/O address enable signal follows the state of the AEN signal except the super I/O address enable signal is deasserted if the bus address has the non-zero value to prevent aliasing on the ISA bus.

* * * * *